United States Patent
Dearing et al.

(10) Patent No.: US 10,969,079 B1
(45) Date of Patent: Apr. 6, 2021

(54) VEHICLE TAILLAMP ASSEMBLY

(71) Applicant: Nissan North America, Inc., Franklin, TN (US)

(72) Inventors: Scott Dearing, Walled Lake, MI (US); Scott Nydam, Farmington Hills, MI (US); Kyle Happy, Walled Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/804,963

(22) Filed: Feb. 28, 2020

(51) Int. Cl.
| | |
|---|---|
| *F21S 43/19* | (2018.01) |
| *F21S 43/27* | (2018.01) |
| *B60Q 1/44* | (2006.01) |
| *B60Q 1/26* | (2006.01) |
| *F21W 103/35* | (2018.01) |

(52) U.S. Cl.
CPC .......... *F21S 43/195* (2018.01); *B60Q 1/2653* (2013.01); *B60Q 1/44* (2013.01); *F21S 43/27* (2018.01); *F21W 2103/35* (2018.01)

(58) Field of Classification Search
CPC ...... F21S 43/195; F21S 43/27; B60Q 1/2653; B60Q 1/44; B60Q 1/30; B60Q 1/307; B60Q 1/2638; B60Q 1/2642; F21W 2103/35; F21W 2103/40; F21W 2103/45
See application file for complete search history.

(56) References Cited

U.S. PATENT DOCUMENTS

| | | | |
|---|---|---|---|
| 5,833,283 A * | 11/1998 | Shaw | B60Q 1/30 293/117 |
| 6,367,949 B1 | 4/2002 | Pederson | |
| 2010/0032971 A1* | 2/2010 | Stoffel | B60Q 1/0433 293/155 |
| 2016/0076720 A1* | 3/2016 | Nantais | B60Q 1/2607 362/511 |
| 2017/0136942 A1* | 5/2017 | Wu | F21S 43/31 |
| 2017/0268741 A1* | 9/2017 | Happy | F21S 43/14 |
| 2018/0194275 A1* | 7/2018 | Williams | F21S 43/26 |
| 2018/0274747 A1* | 9/2018 | Wiesner | F21S 43/255 |
| 2019/0070998 A1 | 3/2019 | Spencer et al. | |

OTHER PUBLICATIONS

Honda, Ridgeline, 2017 model year.
Ford, Ranger, 2017 model year.
Toyota, Tacoma, 2016 model year.
Chevy, Colorado, 2015 model year.

* cited by examiner

*Primary Examiner* — William N Harris
(74) *Attorney, Agent, or Firm* — Global IP Counselors, LLP (57) ABSTRACT

A vehicle taillamp assembly includes an attachment bracket and a lamp housing. The attachment bracket is configured for secure attachment to a vehicle body structure. The attachment bracket has an upright extending portion, an upper horizontally extending portion and a lower horizontally extending portion. The upright extending portion has a first projection extending therefrom and a second projection extending therefrom. The lamp housing is configured to attach to the first projection and the second projection.

18 Claims, 11 Drawing Sheets

VEHICLE TAILLAMP ASSEMBLY

BACKGROUND

Field of the Invention

The present invention generally relates to a vehicle taillamp assembly. More specifically, the present invention relates to vehicle taillamp assembly that includes an attachment bracket that attaches to the vehicle and supports a lamp housing.

Background Information

Vehicle are typically provided with taillamp structure that supports a lamp housing, where the taillamp structure is part of existing vehicle structure.

SUMMARY

One object of the present disclosure is to provide a taillamp assembly with a bracket that is attached to a vehicle body structure and supports a lamp housing.

In view of the state of the known technology, one aspect of the present disclosure is to provide a vehicle taillamp assembly with an attachment bracket and a lamp housing. The attachment bracket is configured for secure attachment to a vehicle body structure. The attachment bracket has an upright extending portion, an upper horizontally extending portion and a lower horizontally extending portion. The upright extending portion has a first projection extending therefrom and a second projection extending therefrom. The lamp housing is configured to attach to the first projection and the second projection.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
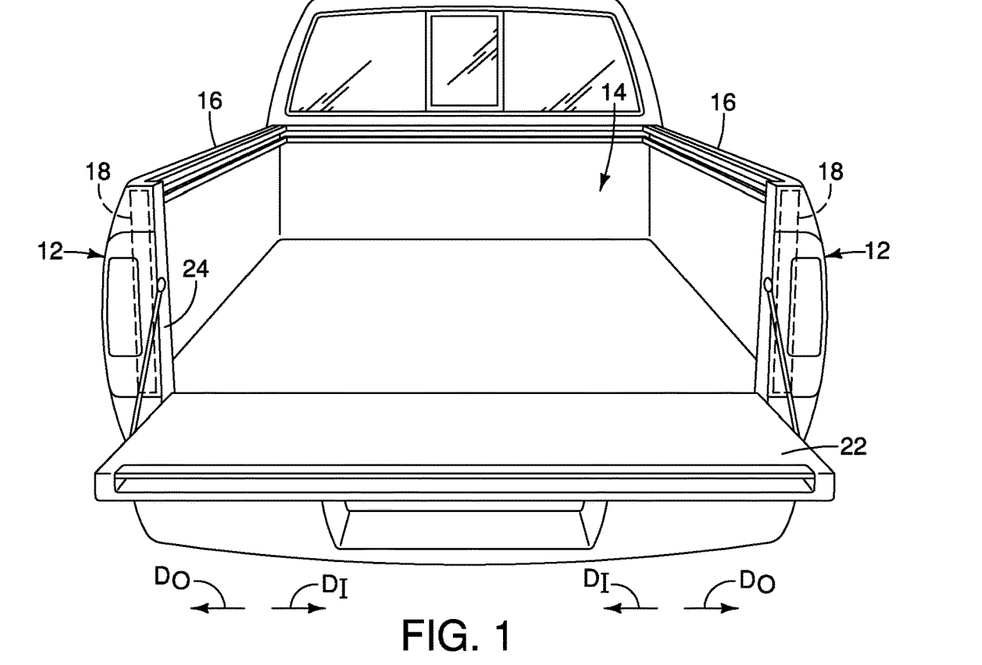
FIG. 1 is a rear view of a vehicle showing a cargo area with side walls with struts structures and a taillamp assembly in accordance with a first embodiment.

Referring initially to FIG. 1, a vehicle 10 that includes a vehicle taillamp assembly 12 is illustrated in accordance with a first embodiment.

The vehicle 10 depicted in the drawings is a pickup truck with a cargo area 14 (also referred to as a cargo area 14 and a vehicle body structure 14). The cargo area 14 is defined by side walls 16 that include pillar or strut structures 18 (FIGS.

Figure 2:
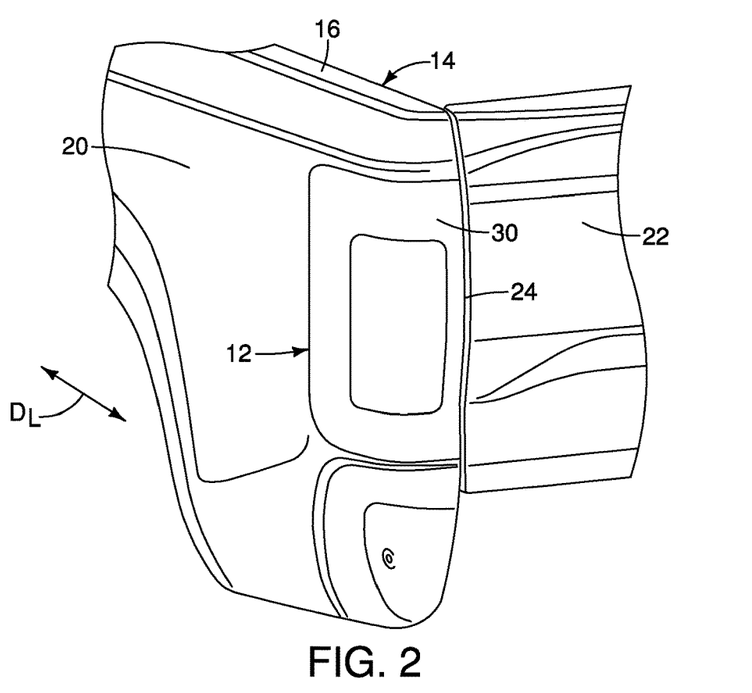
FIG. 2 is a perspective view of a rear corner of the cargo area of the vehicle depicted in FIG. 1 showing a side panel of a side wall of the cargo area and a lamp housing of the taillamp assembly in accordance with the first embodiment.

1, 5 and 10-15) and outer panels 20. A tailgate 22 is installed between the strut structures 18 and is movable between a closed orientation (an upright orientation, shown in FIG. 2) closing a tailgate opening 24 and an open orientation (a lowered orientation, shown in FIG. 1) exposing the tailgate opening 24 in a conventional manner. The tailgate opening 24 is defined between the strut structures 18 at the rearward end of the side walls 16.

The two rear corners of the cargo area 14 are basically the same, except that they are symmetrical mirror images of one another. More specifically, the side wall 16, strut structure 18 and the lamp assembly 12 on the driver's side of the vehicle 10 is identical to the side wall 16, strut structure 18 and the lamp assembly 12 on the passenger's side of the vehicle 10. Accordingly, a description of only one side of the rear of the vehicle 10 is provided for the sake of brevity but applies equally to both sides of the vehicle 10.

Figure 3:
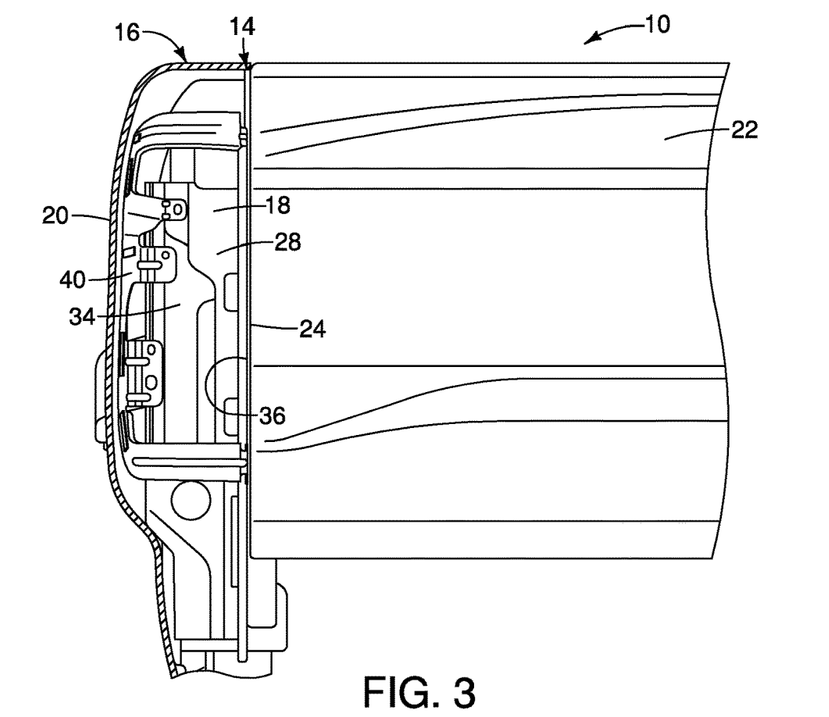
FIG. 3 is a rear view of the rear corner of the cargo area of the vehicle with the lamp housing of the taillamp assembly removed showing an attachment bracket of the taillamp assembly installed within a hidden cavity within side wall of the cargo area in accordance with the first embodiment.
Figure 4:
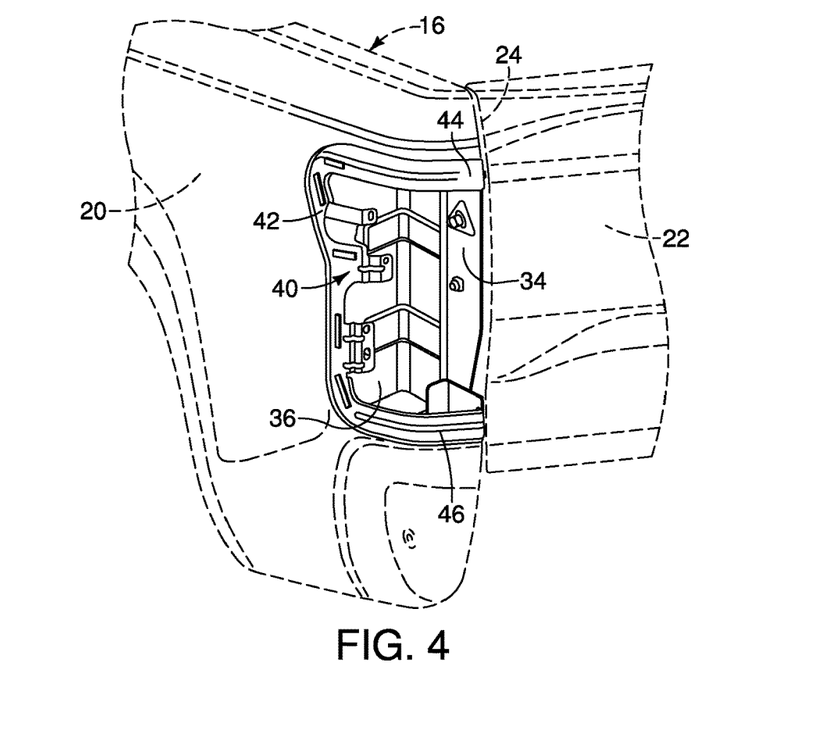
FIG. 4 is a perspective view of the rear corner of the cargo area of the vehicle depicted similar to FIG. 2 with the lamp housing removed showing the attachment bracket of the taillamp assembly installed within the hidden cavity within side wall of the cargo area in accordance with the first embodiment.
Figure 5:
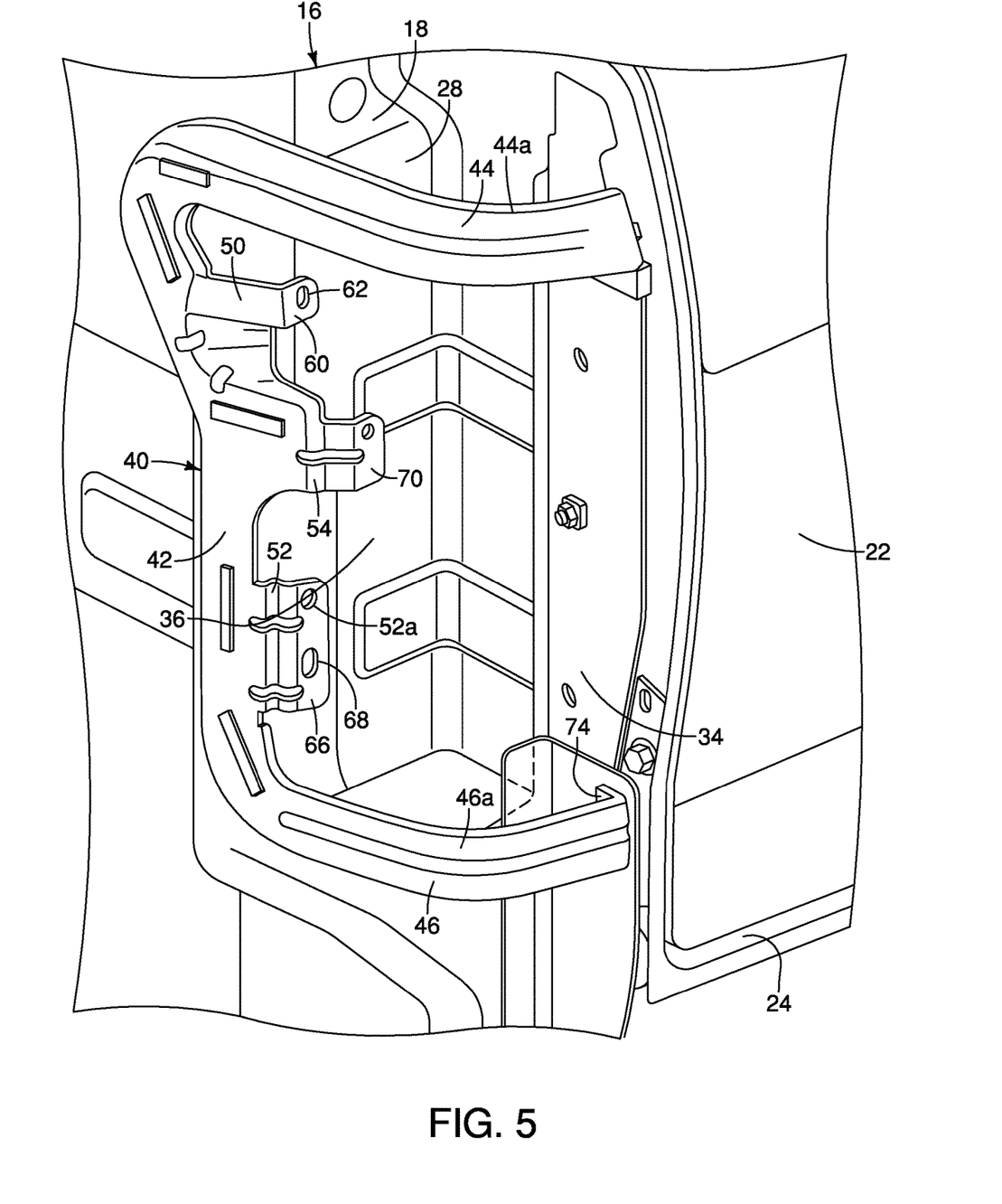
FIG. 5 is a perspective view of the rear corner of the cargo area of the vehicle depicted with the lamp housing and the side panel of the side wall removed showing the attachment bracket of the taillamp assembly installed within the hidden cavity within side wall of the cargo area in accordance with the first embodiment.
Figure 6:
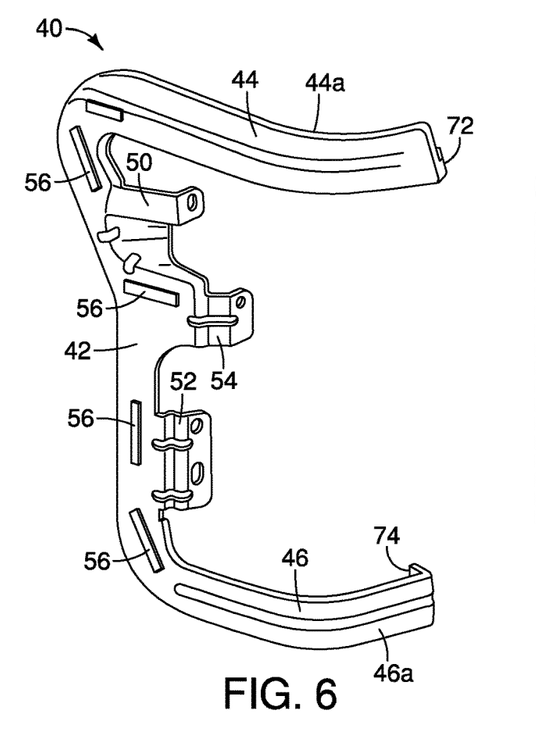
FIG. 6 is a perspective view of the attachment bracket removed from the vehicle showing an outboard side of the attachment bracket including details of an upright extending portion, an upper horizontally extending portion and a lower horizontally extending portion in accordance with the first embodiment.

As shown in FIGS. 3-5, the rear area of the side wall 16 includes a cavity 28 that is exposed when a lamp housing 30 of the vehicle lamp assembly 12 is removed from the vehicle 10, as shown in FIGS. 3-5. The cavity 28 is, at least in part, defined by wall sections of the strut structure 18. As shown in FIG. 5, the cavity 28 is at least partially defined by the strut structure 18. Specifically, the strut structure 18 includes an upright panel that has an outboard facing surface 34. The cavity 28 is also at least partially defined by a wall section of the side wall 16 which includes a rearward facing surface 36.

The vehicle taillamp assembly 12 (also referred to herein below as the lamp assembly 12) includes the lamp housing 30 and an attachment bracket 40. The lamp housing 30 is preferably a light-weight assembly that includes various lamp sections. For example, the lamp housing 30 can include some or all of a backup lamp section, a turn-signal section, a braking lamp section and a running lamp section. Since such lamp sections are conventional vehicle features, further description is omitted for the sake of brevity. The lamp assembly 12 is installed to the rear of the vehicle 10 such that at least a portion of the lamp assembly 12 covers and conceals the cavity 28 and covers and conceals the attachment bracket 40. The lamp assembly 12 also attaches to and is supported by the attachment bracket 40 and by fasteners Fi, as shown in FIGS. 5,12 and 14-15, and described further below.

The attachment bracket 40 is configured for secure attachment to the vehicle body structure 14 (the cargo area 14). More specifically as shown in FIGS. 4 and 5, the attachment bracket 40 is installed to surfaces exposed within the cavity 28, as is described further below.

As shown removed from the vehicle 10 in FIGS. 6-11, the attachment bracket 40 has an upright extending portion 42, an upper horizontally extending portion 44 and a lower horizontally extending portion 46. The attachment bracket 40 has an overall C-shape as viewed from a side thereof (FIGS. 6 and 7) with the C-shape being defined by the upright extending portion 42, the upper horizontally extending portion 44 and the lower horizontally extending portion 46. The upper horizontally extending portion 44 and the lower horizontally extending portion 46 extend in a rearward direction from the upright extending portion 42, with the attachment bracket 40 installed to the vehicle 10.

Figure 17:
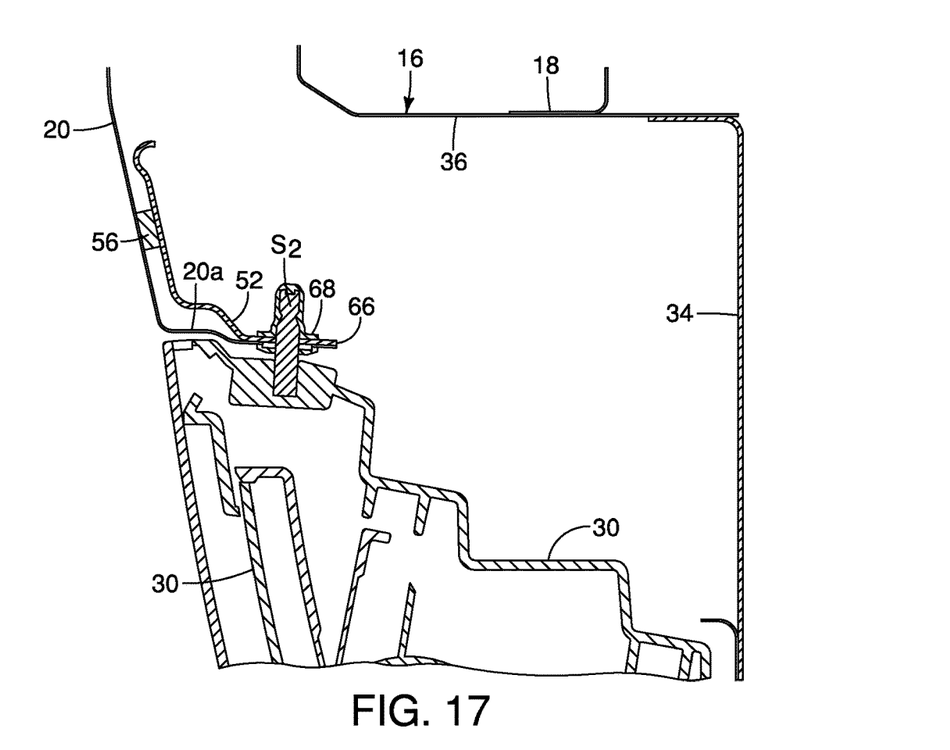
FIG. 17 is a cross-sectional view of the rear corner of the cargo area taken along the line 17-17 in FIG. 15 showing attachment between the attachment bracket and the lamp housing in accordance with the first embodiment.

The upright extending portion 42 includes a first projection 50, a second projection 52 and a third projection 54. The first projection 50, the second projection 52 and the third projection 54 all extend rearward (relative to the vehicle 10) from the upright extending portion 42. The upright extending portion 42 further includes a plurality of adhesive strips 56 that are positioned to contact and adhere to an inboard surface of the outer panel 20, as shown in FIG. 17.

Figure 16:
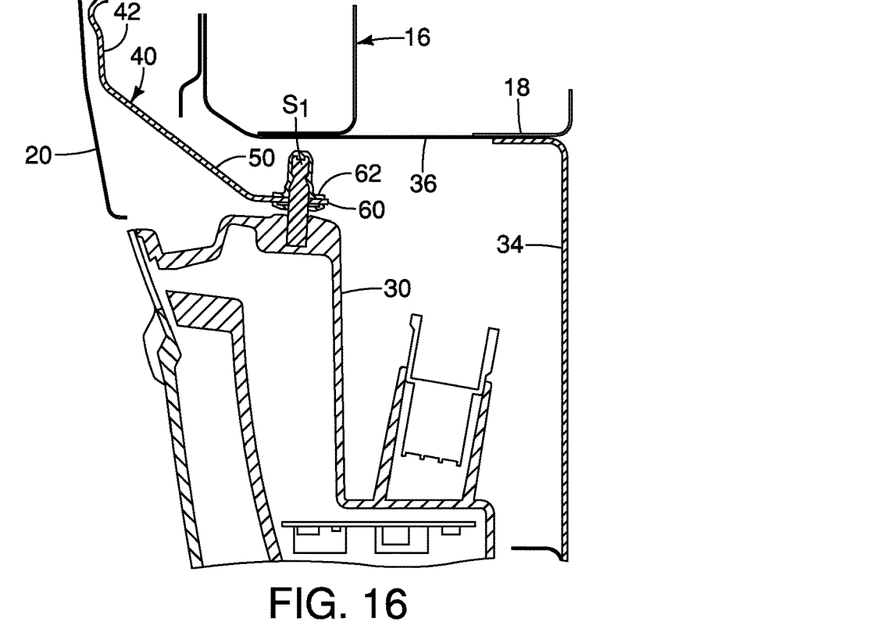
FIG. 16 is a cross-sectional view of the rear corner of the cargo area taken along the line 16-16 in FIG. 15 showing attachment between the attachment bracket and the lamp housing in accordance with the first embodiment.

The first projection 50 is located above the second and third projections 52 and 54. The second projection 52 is below both the first and third projections 50 and 54, with the third projection 54 being between the first and second projections 50 and 52. The first projection 50 of the upright extending portion 42 of the attachment bracket 30 has an inboard extending flange 60 that defines a first lamp housing attachment structure 62. Specifically, the inboard extending flange 60 is a flat extension of the first projection 50 and includes an aperture that receives a pin or snap-fitting projection Si of the lamp housing, as shown in FIG. 16.

Figure 7:
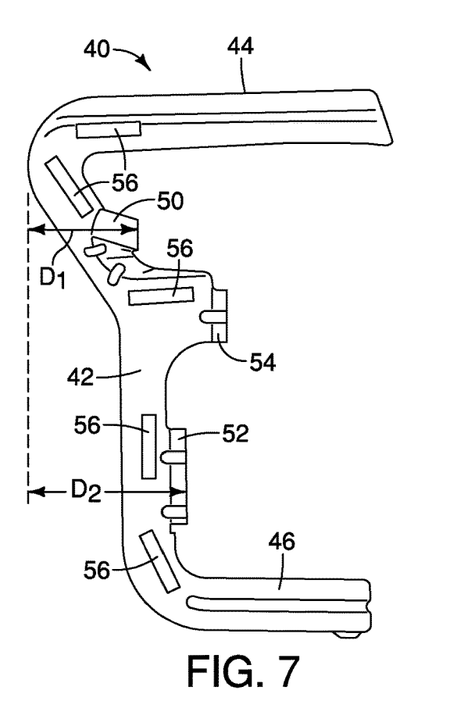
FIG. 7 is a side view of the attachment bracket removed from the vehicle showing the outboard side of the upright extending portion, the upper horizontally extending portion and the lower horizontally extending portion in accordance with the first embodiment.
Figure 8:
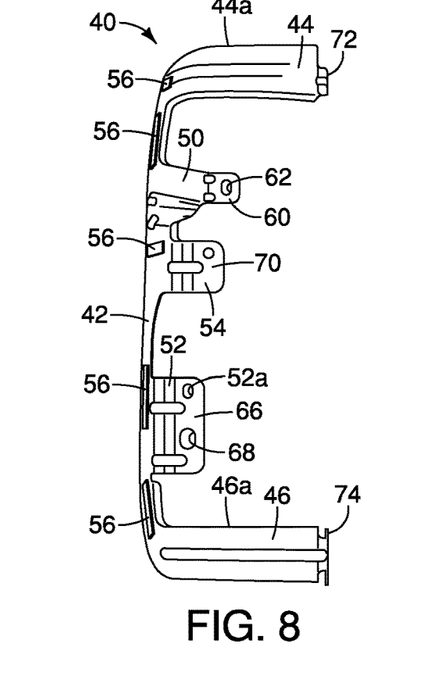
FIG. 8 is a rear side view of the attachment bracket removed from the vehicle showing first, second and third projections that extend rearward from the upright extending portion in accordance with the first embodiment.
Figure 9:
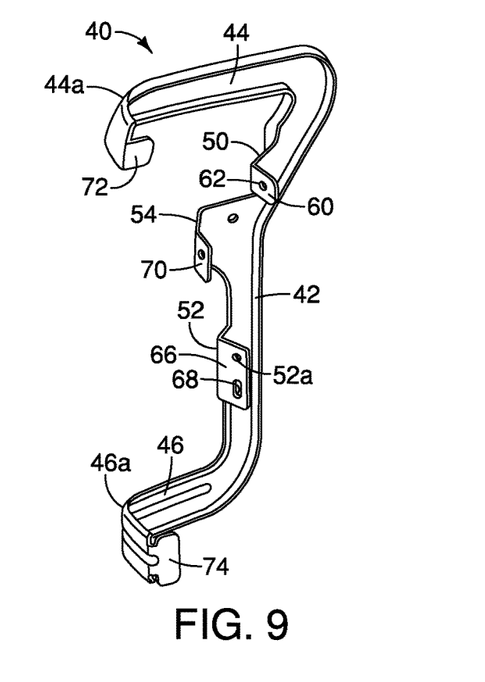
FIG. 9 is another perspective view of the attachment bracket removed from the vehicle showing an inboard side of the upright extending portion, the upper horizontally extending portion and the lower horizontally extending portion in accordance with the first embodiment.
Figure 10:
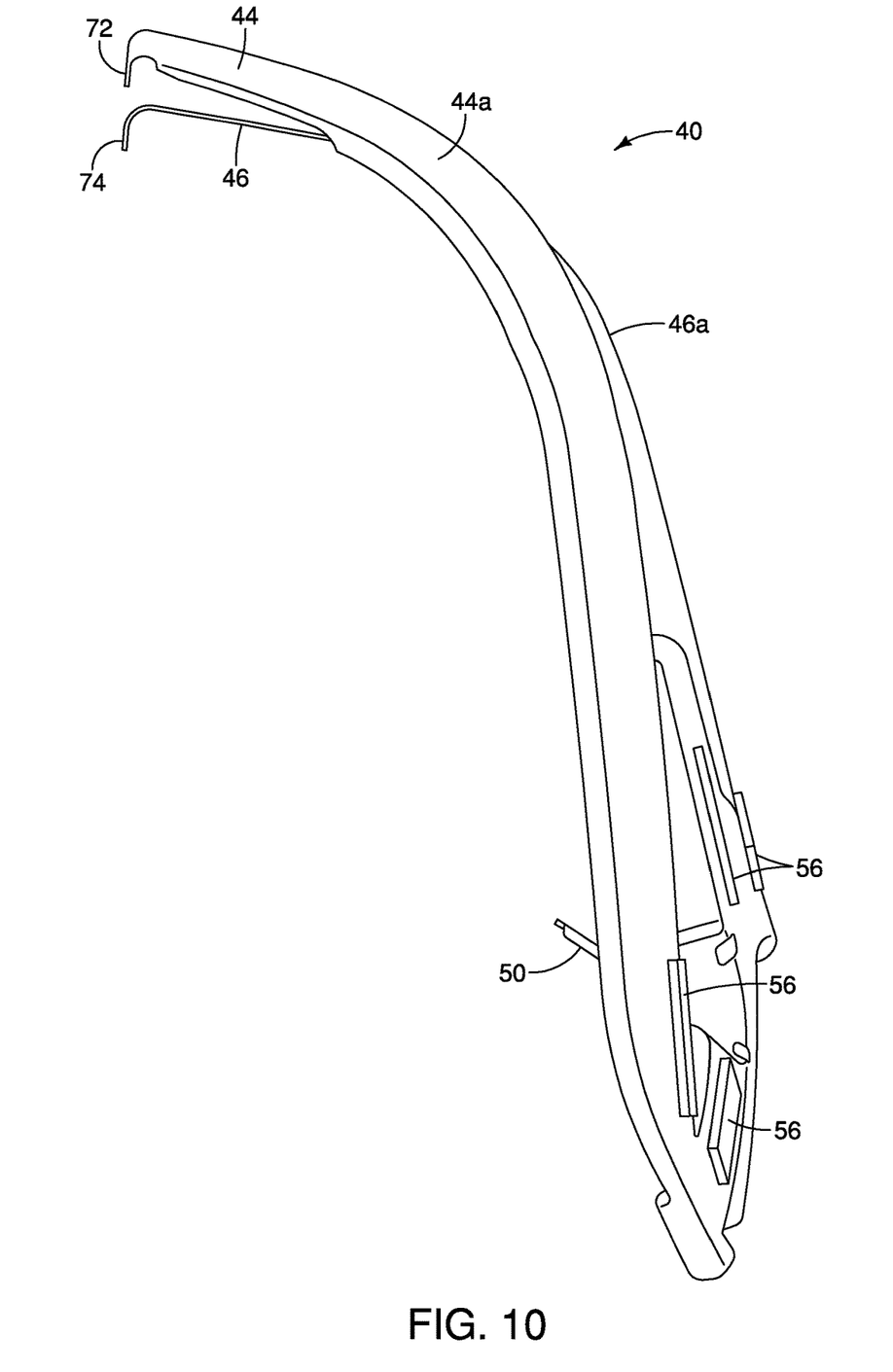
FIG. 10 is a top view of the attachment bracket in accordance with the first embodiment.
Figure 11:
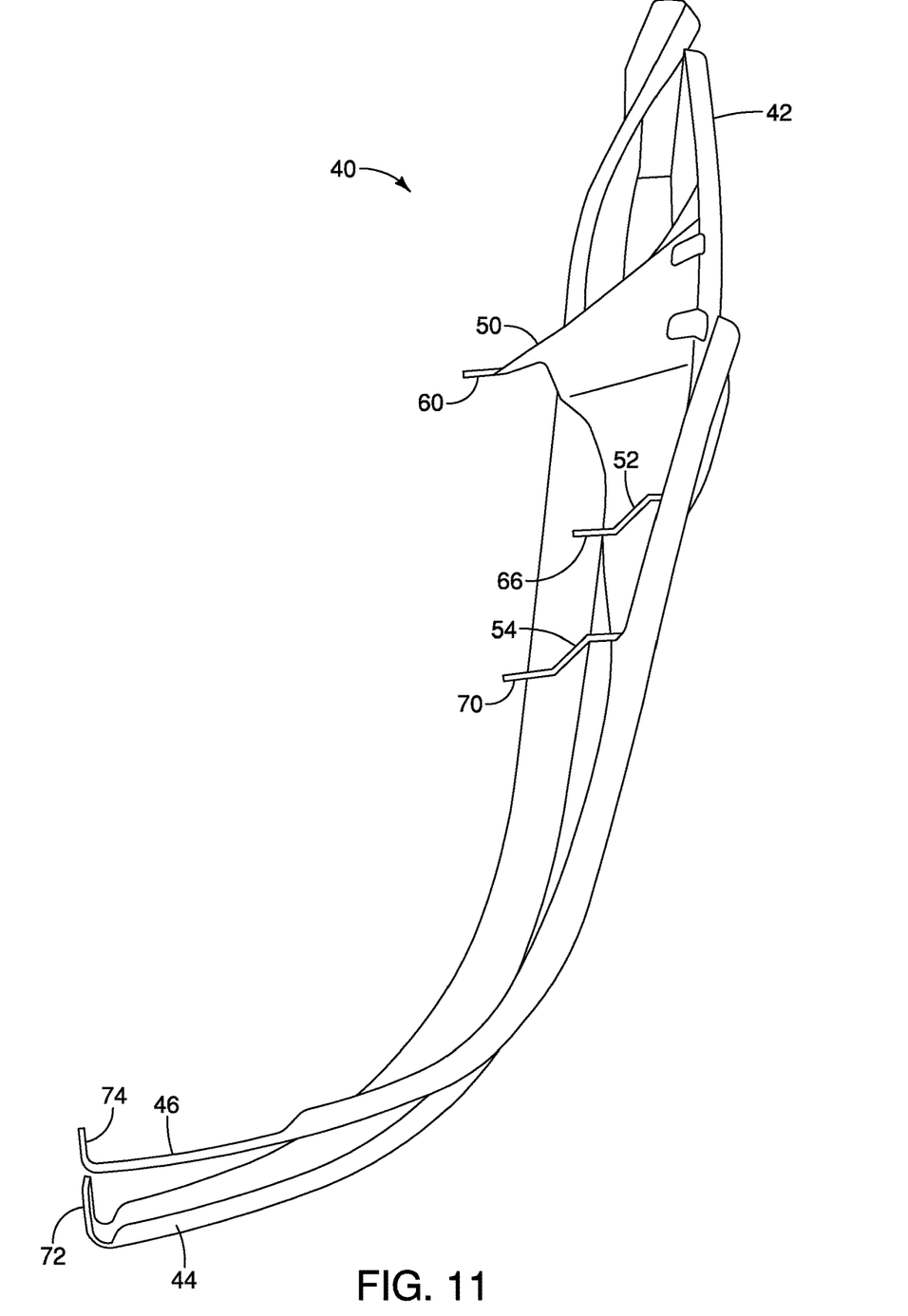
FIG. 11 is a bottom view of the attachment bracket in accordance with the first embodiment.
Figure 12:
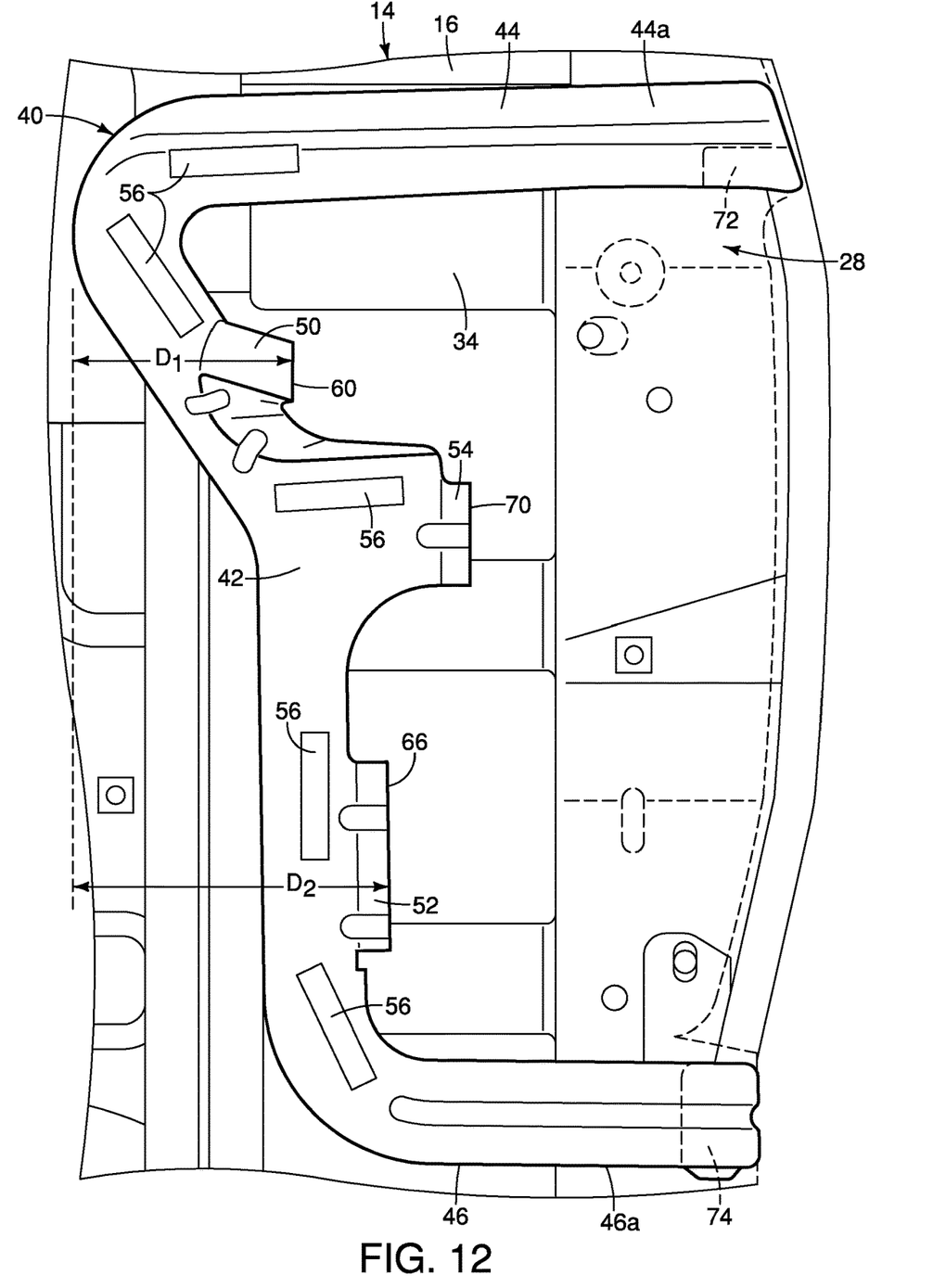
FIG. 12 is a side view of the rear corner of the cargo area of the vehicle depicted similar to FIG. 2 with the lamp housing and side panel removed showing the attachment bracket of the taillamp assembly installed within the hidden cavity of side wall of the cargo area in accordance with the first embodiment.

The first projection 50 of the upright extending portion 42 of the attachment bracket 40 extends rearward from a forward most part of the upright extending portion 42 a first distance $D_1$, as shown in FIGS. 7 and 12.

The second projection 52 of the upright extending portion 42 of the attachment bracket 30 has an inboard extending flange 66 that defines a second lamp housing attachment structure 68 that is located below the first lamp housing attachment structure 62, as shown in FIGS. 6-9. The second projection 52 extends rearward from the upright extending portion 42 a second distance $D_2$ that is greater than the first distance $D_1$, as shown in FIGS. 7 and 12. A portion 52a of the second projection 52 is welded to an inboard surface 20a of the side panel 20 when installed to the vehicle 10, as shown in FIG. 17.

The third projection 54 is located below the first projection 50 and above the second projection 52, as shown in FIGS. 6-9. Although not shown, the third projection 54 has an inboard extending flange 70 that is welded to the inboard surface 20a of the side panel 20 in a manner similar to the welding of the portion 52a of the second projection 52. Hence, the second projection 52 and the third projection 54 are welded to the outer panel 20 of the side wall 16 of the cargo area 14 (the vehicle body structure 14).

Figure 13:
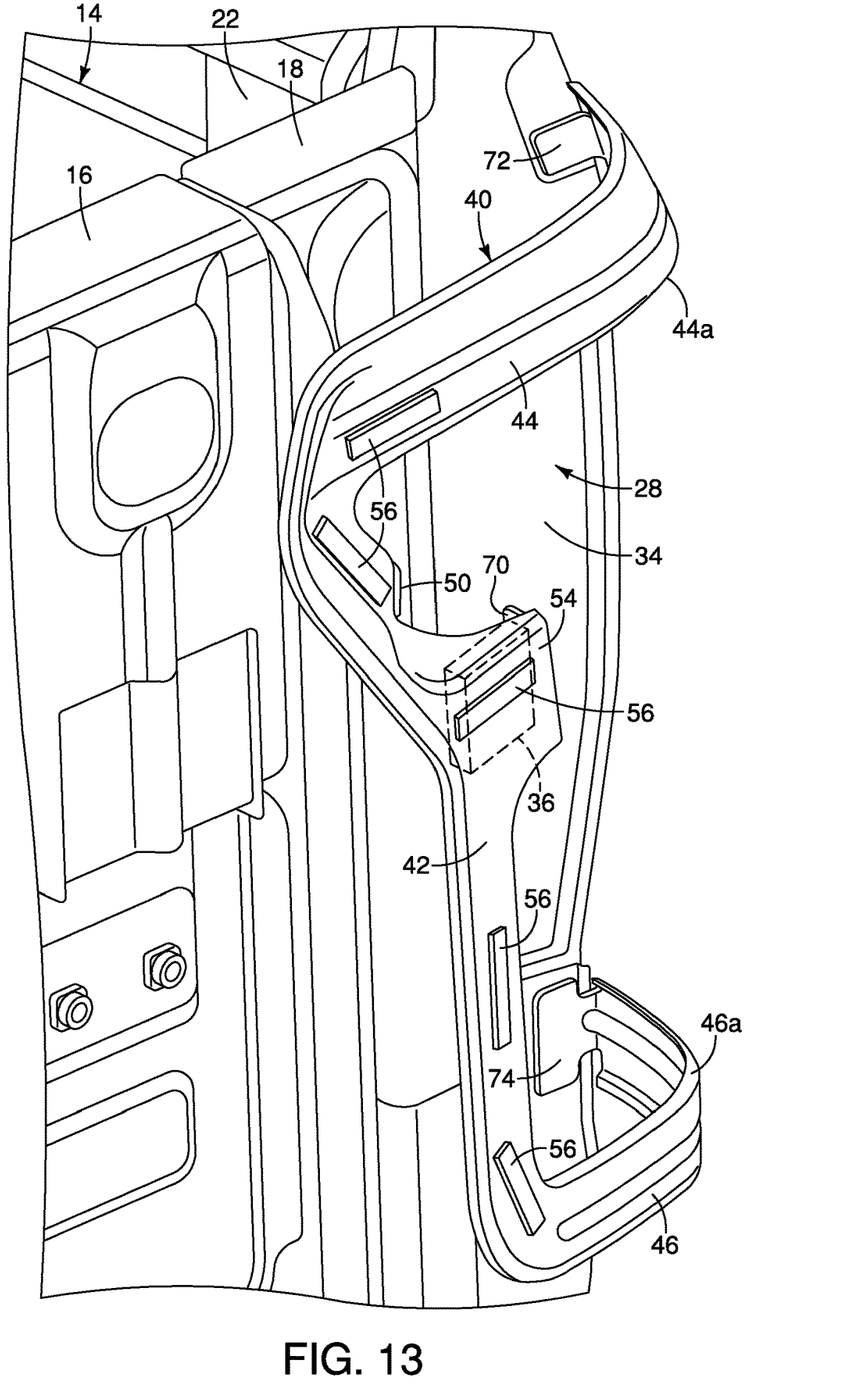
FIG. 13 is another perspective view of the rear corner of the cargo area of the vehicle depicted with the lamp housing and the side panel removed showing the attachment bracket of the taillamp assembly installed within the hidden cavity of side wall of the cargo area in accordance with the first embodiment.
Figure 14:
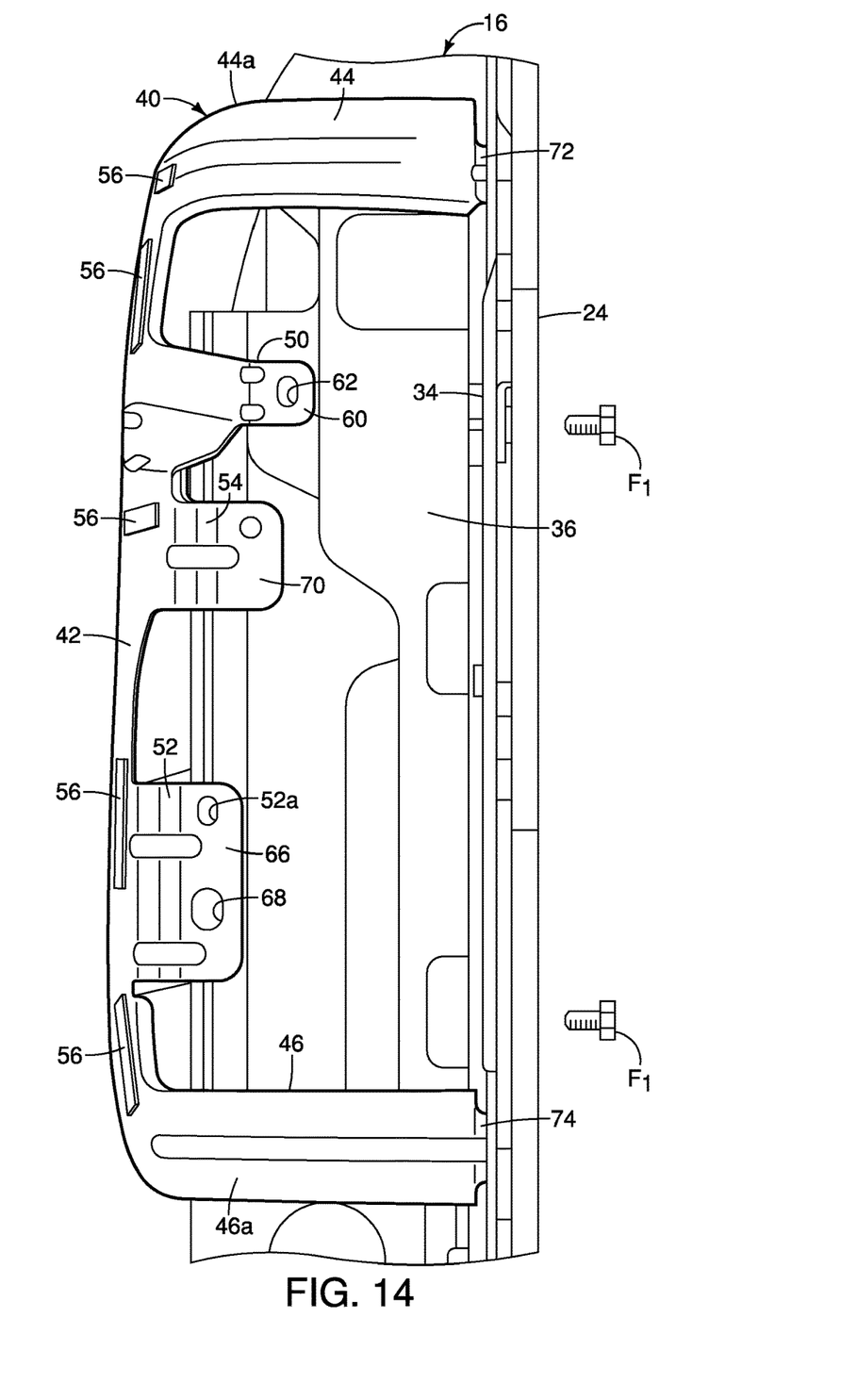
FIG. 14 is a rear end view of the rear corner of the cargo area of the vehicle depicted with the lamp housing and the side panel removed showing the attachment bracket of the taillamp assembly installed within the cavity within side wall of the cargo area in accordance with the first embodiment.

As shown in FIGS. 6-11, the upper horizontally extending portion 44 includes a curved portion 44a that extends in an inboard direction $D_1$ and includes a first attachment flange 72 that extends from a distal end thereof. The first attachment flange 72 extends in a vehicle forward direction from the distal end of the upper horizontally extending portion 44. As shown in FIGS. 13 and 14, the first attachment flange 72 is welded to the outboard facing surface 34 of the strut structure 18 (part of the vehicle body structure 14) adjacent to the tailgate 22.

As shown in FIGS. 6-11, the lower horizontally extending portion 46 also has a curved portion 46a that extends in the inboard direction $D_1$ and includes a second attachment flange 74 that extends from a distal end of the lower horizontally extending portion 46. The second attachment flange 74 extends in a vehicle forward direction from the distal end the lower horizontally extending portion 46. Further, as shown in FIGS. 13 and 14, the second attachment flange 74 is welded to the outboard facing surface 34 of the strut structure 18 adjacent to the tailgate 22.

Figure 15:
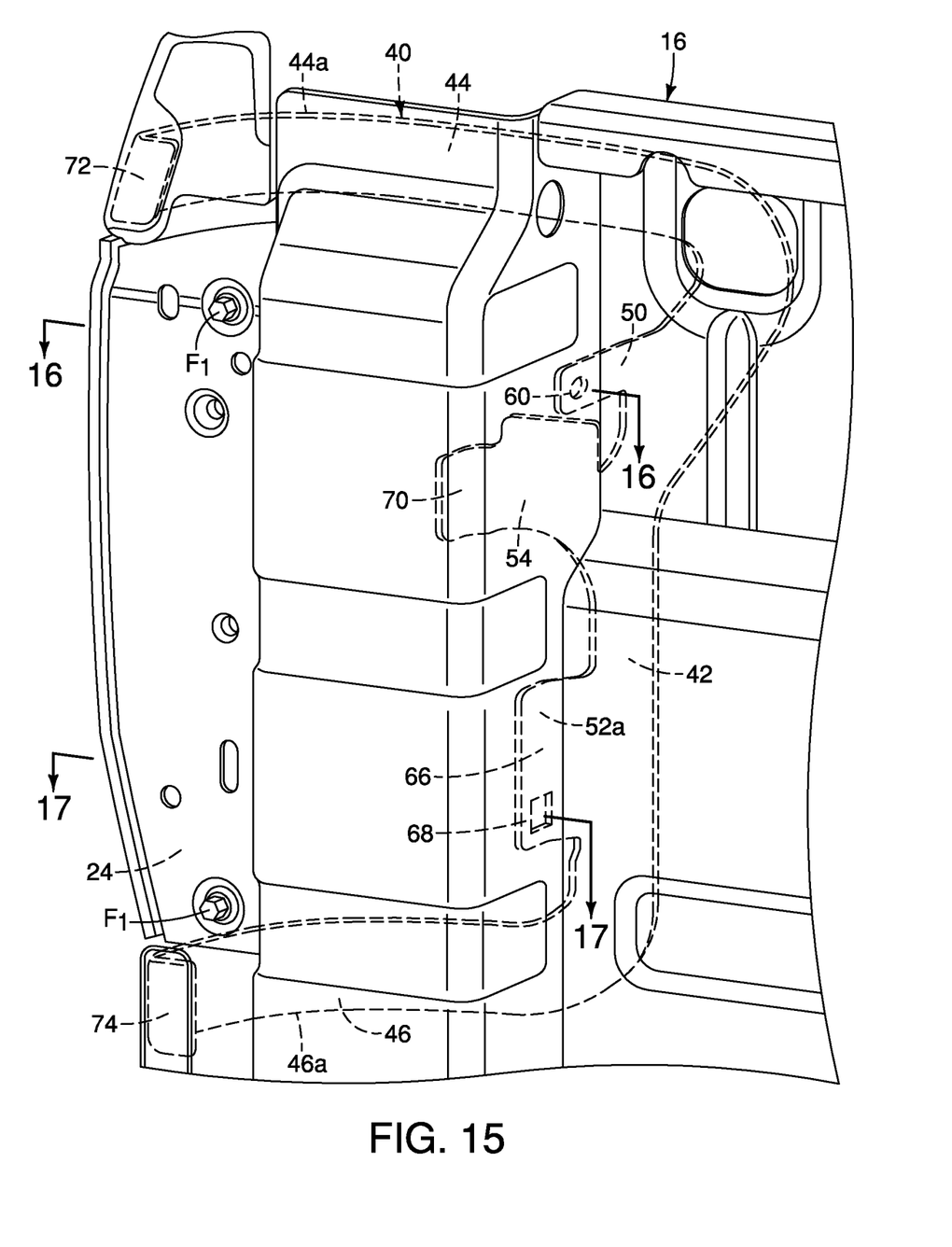
FIG. 15 is a perspective view of the rear corner of the cargo area of the vehicle looking rearward from within the cargo area showing the attachment bracket in phantom in accordance with the first embodiment.

As described above, the lamp housing 30 attaches to the first projection 52 and the second projection 54 of the attachment bracket 40. The lamp housing 30 is also fixed in position by installation of the fasteners Fi, as shown in FIGS. 14 and 15. Once the lamp housing 30 is installed to the attachment bracket 40 and the strut structure 18, the lamp housing 30 completely covers and conceals the attachment bracket 40 and the cavity 28. The attachment bracket 40 provides the benefit of attaching the lamp housing 30 to the vehicle with good alignment with the cavity 28. Since the attachment bracket 40 is manufactured separately from the cargo area 14 and the side walls 16, it can be more precisely shaped and installed, thus making a more consistent positioning of the lamp housing 30 relative to the side wall 16.

The vehicle body structures, features and elements (other than the lamp assembly 12) are conventional components that are well known in the art. Since these structures, features and elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle taillamp assembly. Accordingly, these terms, as utilized to describe the present invention should be interpreted relative to a vehicle equipped with the vehicle taillamp assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle taillamp assembly, comprising:
   an attachment bracket configured for secure attachment to a vehicle body structure, the attachment bracket having an upright extending portion, an upper horizontally extending portion and a lower horizontally extending portion, the upright extending portion having a first projection extending therefrom and a second projection extending therefrom; and
   a lamp housing configured to attach to the first projection and the second projection.

2. The vehicle taillamp assembly according to claim 1, wherein
   the attachment bracket has an overall C-shape as viewed from a side thereof.

3. The vehicle taillamp assembly according to claim 1, wherein
   the first projection of the upright extending portion of the attachment bracket defines a first lamp housing attachment structure, and
   the second projection of the upright extending portion of the attachment bracket defines a second lamp housing attachment structure located below the first lamp housing attachment structure.

4. The vehicle taillamp assembly according to claim 1, wherein
   the first projection of the upright extending portion of the attachment bracket extends rearward from the upright extending portion a first distance, and
   the second projection of the upright extending portion of the attachment bracket extends rearward from the upright extending portion a second distance greater than the first distance.

5. The vehicle taillamp assembly according to claim 1, wherein
   the second projection is welded to the vehicle body structure when installed to a vehicle.

6. The vehicle taillamp assembly according to claim 5, wherein
   the upright extending portion further includes a third projection located below the first projection and above the second projection.

7. The vehicle taillamp assembly according to claim 6, wherein
   the third projection is welded to the vehicle body structure.

8. The vehicle taillamp assembly according to claim 1, wherein
   the upright extending portion further includes a third projection located below the first projection and above the second projection.

9. The vehicle taillamp assembly according to claim 8, wherein
   the second projection and the third projection are welded to the vehicle body structure.

10. The vehicle taillamp assembly according to claim 1, wherein
    the upper horizontally extending portion has a curved portion that extends in an inboard direction and includes a first attachment flange extending from a distal end thereof.

11. The vehicle taillamp assembly according to claim 10, wherein
    the first attachment flange extends in a vehicle forward direction from the distal end thereof.

12. The vehicle taillamp assembly according to claim 10, wherein
    the first attachment flange is welded to the vehicle body structure adjacent to a tailgate of the vehicle body structure.

13. The vehicle taillamp assembly according to claim 10, wherein
the lower horizontally extending portion has a curved portion that extends in an inboard direction and includes a second attachment flange extending from a distal end thereof.

14. The vehicle taillamp assembly according to claim 13, wherein
the second attachment flange extends in a vehicle forward direction from the distal end thereof.

15. The vehicle taillamp assembly according to claim 14, wherein
the second attachment flange is welded to the vehicle body structure adjacent to a tailgate of the vehicle body structure.

16. The vehicle taillamp assembly according to claim 1, wherein
the lamp housing conceals the attachment bracket with the attachment bracket installed to the vehicle body structure and the lamp housing attached to the attachment bracket.

17. The vehicle taillamp assembly according to claim 1, wherein
the upper horizontally extending portion includes a first attachment flange extending from a distal end thereof, and
the lower horizontally extending portion includes a first second attachment flange extending from a distal end thereof, the first and second attachment flanges being fixedly attached to the vehicle body structure adjacent to a tailgate of the vehicle body structure.

18. The vehicle taillamp assembly according to claim 1, wherein
the upright extending portion further includes a third projection located below the first projection and above the second projection.

\* \* \* \* \*